United States Patent
Hess et al.

(10) Patent No.: US 10,761,106 B2
(45) Date of Patent: Sep. 1, 2020

(54) ROTARY SPEED SENSORS

(71) Applicant: Hamilton Sundstrand Corporation, Charlotte, NC (US)

(72) Inventors: Gary L. Hess, Enfield, CT (US); Kirk A. Lillestolen, East Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/438,674

(22) Filed: Jun. 12, 2019

(65) Prior Publication Data
US 2019/0293675 A1 Sep. 26, 2019

Related U.S. Application Data

(62) Division of application No. 15/134,160, filed on Apr. 20, 2016, now Pat. No. 10,352,955.

(51) Int. Cl.
| | | |
|---|---|---|
| *G01R 33/09* | (2006.01) | |
| *G01P 3/46* | (2006.01) | |
| *G01D 5/20* | (2006.01) | |
| *G01P 3/488* | (2006.01) | |
| *G01P 3/489* | (2006.01) | |

(52) U.S. Cl.
CPC .............. *G01P 3/46* (2013.01); *G01D 5/2006* (2013.01); *G01P 3/488* (2013.01); *G01P 3/489* (2013.01)

(58) Field of Classification Search
CPC ...... B82Y 25/00; G01R 33/093; G01R 33/09; G01D 5/145; G01D 11/245; G01D 5/2006; G01P 3/487; G01P 3/46; G01P 3/488; G01P 3/489; G01B 7/30

USPC ............ 324/207.15–207.17, 207.25, 66–67, 324/160–180, 71.1–157, 200–263; 702/1–199, 37–65.09, 700–756

See application file for complete search history.

(56) References Cited

U.S. PATENT DOCUMENTS

| | | | |
|---|---|---|---|
| 4,804,911 A | 2/1989 | Saito et al. | |
| 4,931,727 A | 6/1990 | Yamanoue et al. | |
| 5,404,054 A | 4/1995 | Kotowski | |
| 5,432,442 A | 7/1995 | Andersen | |
| 5,506,743 A * | 4/1996 | Phillips | H02H 7/09 361/85 |
| 5,570,052 A | 10/1996 | Fonderie et al. | |

(Continued)

FOREIGN PATENT DOCUMENTS

| | | | |
|---|---|---|---|
| DE | 11200900013 | 11/2010 | |
| DE | 112009000130 | * 11/2010 | ............ G01D 5/244 |

OTHER PUBLICATIONS

Extended European Search Report for European Patent Application No. EP17167395.7, dated Sep. 22, 2017.

(Continued)

*Primary Examiner* — Patrick Assouad
*Assistant Examiner* — Taqi R Nasir
(74) *Attorney, Agent, or Firm* — Locke Lord LLP; Scott D. Wofsy; Judy R. Naamat

(57) ABSTRACT

A speed detection device includes a comparator module, a sensor lead with a node connected to the comparator module, and a limit set module. The limit set module is connected to the sensor lead node and to the comparator by an upper limit lead and a lower limit lead to provide upper and lower limits to the comparator that vary according to amplitude variation in voltage applied to the sensor lead.

4 Claims, 4 Drawing Sheets

(56) References Cited

U.S. PATENT DOCUMENTS

| | | | |
|---|---|---|---|
| 6,297,627 B1 | 10/2001 | Towne et al. | |
| 6,693,419 B2 | 2/2004 | Stauth et al. | |
| 8,510,361 B2* | 8/2013 | Massenburg | H03G 3/002 |
| | | | 708/300 |
| 9,091,566 B2 | 7/2015 | Tsukamoto et al. | |
| 2003/0062885 A1* | 4/2003 | Ballan | H03G 3/345 |
| | | | 324/76.28 |
| 2003/0231013 A1* | 12/2003 | Faymon | G01P 3/488 |
| | | | 324/166 |
| 2004/0189285 A1 | 9/2004 | Uenoyama | |
| 2004/0222779 A1 | 11/2004 | Cock et al. | |
| 2005/0083044 A1 | 4/2005 | Fujii et al. | |
| 2007/0035293 A1 | 2/2007 | Fukuoka et al. | |
| 2008/0298784 A1 | 12/2008 | Kastner | |
| 2010/0231208 A1 | 9/2010 | Huggett et al. | |
| 2012/0167732 A1 | 7/2012 | Gass et al. | |
| 2013/0113457 A1 | 5/2013 | Albsmeier et al. | |
| 2014/0214352 A1 | 7/2014 | Tart et al. | |
| 2014/0233144 A1* | 8/2014 | Seon | G01R 19/02 |
| | | | 361/115 |
| 2014/0257799 A1* | 9/2014 | Shepard | H03G 3/3005 |
| | | | 704/206 |
| 2015/0015175 A1 | 1/2015 | Ariga et al. | |
| 2016/0025820 A1 | 1/2016 | Scheller et al. | |

OTHER PUBLICATIONS

Office Action from the European Patent Office for European Patent Application No. EP17167395.7, dated Sep. 24, 2019.

\* cited by examiner

ROTARY SPEED SENSORS

CROSS-REFERENCE TO RELATED APPLICATIONS

This application is a divisional of U.S. patent application Ser. No. 15/134,160 filed Apr. 20, 2016 which is incorporated herein by reference in its entirety.

BACKGROUND OF THE INVENTION

1. Field of the Invention

The present disclosure relates to rotating machinery, and more particularly to rotary speed sensors for rotating machines.

2. Description of Related Art

Rotating machinery, such as gas turbine engines, commonly include rotatable components such as shafts and disks. Since the rotational speed of such components is generally of interest during operation, rotating machinery typically include devices for measuring the speed of rotating components. Examples of such devices include tachometers, which can have an element that physically contacts a rotating component, and flag/detector arrangements, where the flag is typically physically separated from the detector by a gap. Such devices typically output a signal containing information relating to speed, such as an output voltage that oscillates according to the proximity of the flag to the detector as the rotatable component rotates.

In some rotating machinery conditions unrelated to the rotational speed of the rotatable component can influence the output voltage oscillation. For example, electrical noise can develop within the wiring carrying the voltage, manufacturing variation can induce error in the flag position, and vibration can be present in the rotating machine. Accordingly, the output voltage is commonly filtered or hysteresis of the signal increased with increasing rotational speed of the rotatable component.

Such conventional methods and systems have generally been considered satisfactory for their intended purpose. However, there is still a need in the art for improved speed detection systems and methods. The present disclosure provides a solution for this need.

SUMMARY OF THE INVENTION

A speed detection device includes a comparator module, a sensor lead with a node connected to the comparator module, and a limit set module. The limit set module is connected to the sensor lead node and to the comparator by an upper limit lead and a lower limit lead to provide upper and lower limits to the comparator that vary according to amplitude variation in voltage applied to the sensor lead.

In certain embodiments, the rotary speed detector can include a buffer. The buffer can be connected in series with the sensor lead node. A rotation sensor can be connected in series with the sensor lead node. The rotation sensor can be connected in series with the comparator. The rotation sensor can include a rotatable gear element having at least one tooth, a coil fixed relative to the gear element and electrically connected to the sensor lead, a pole piece extending through the coil, and a magnet connected to the power piece. The rotation sensor coil can be configured to apply a voltage to the sensor lead that varies according gear element rotational speed.

In accordance with certain embodiments, the comparator can have a sensor input, an upper limit input, and a lower limit input. The comparator can have a digital output. The digital output can toggle between high a low with rotation of a rotatable component coupled to the comparator by the rotation sensor. The limit set module can have a constant voltage input lead connected to an input of the limit set module. A reference voltage source can connected to the limit set module and can be configured to apply a fixed voltage to the constant voltage input lead of the limit set module.

It is also contemplated that, in accordance with certain embodiments, the limit set module can include an inverting amplifier. The inverting amplifier can be connected in series with the lower limit lead. The limit set module can include a summing module. The summing module can be connected to the comparator by the upper limit lead. The summing module can be connected to the comparator by the lower limit lead. A peak or root-mean-square (RMS) detector module can be connected in series between the sensor lead node and the summing module. The limit set module can include a maximum value (MVS) module. The MVS module can be connected to the comparator by the upper limit lead. The MVS module can be connected to the comparator by the lower limit lead. A peak or root-mean-square (RMS) detector module can be connected in series between the sensor lead node and the MVS module.

A rotary speed detector includes a comparator module, a sensor lead with a node connected to the comparator module, a limit set module connected to the sensor lead node, an upper limit lead connecting the limit set module to the comparator module, and a lower limit lead connecting the limit set module to the comparator module. The limit set module includes a peak or RMS level detection module connected in series with the sensor lead node, and the limit set module includes a summing or max value select module connected in series between the peak or RMS level detection module and the comparator module.

A method of determining rotary speed of a rotatable component includes receiving an oscillating voltage waveform indicative of rotational speed of the rotatable component and determining amplitude of the oscillating voltage waveform. When amplitude of the oscillating voltage waveform is below a predetermined value, a hysteresis level is set according to a fixed reference voltage. When amplitude of the oscillating voltage waveform is above the predetermined value, a hysteresis level varies according to the amplitude of the oscillating voltage waveform. In certain embodiments, the amplitude is determined based on the peak voltage of the oscillating voltage waveform. In accordance with certain embodiments, the amplitude is determined based on RMS of the oscillating voltage waveform.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
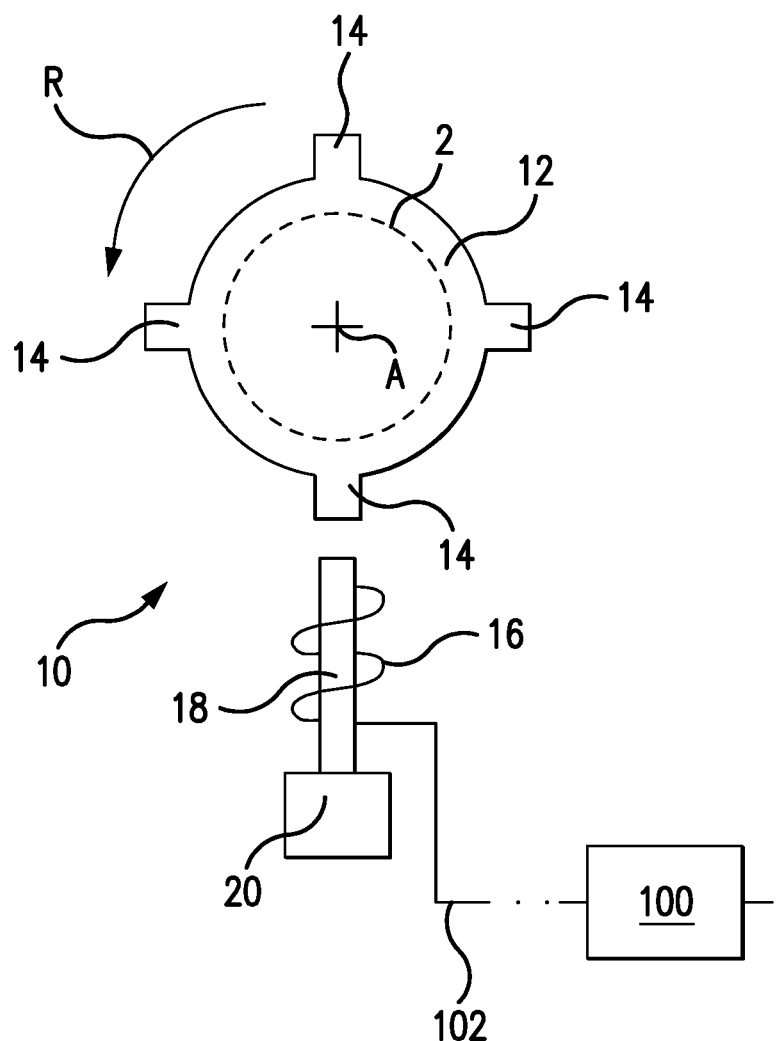
FIG. 1 is a schematic block diagram of an exemplary embodiment of a rotary speed detector constructed in accordance with the present disclosure, showing a rotation sensor electrically connected to a rotary speed detector.

Reference will now be made to the drawings wherein like reference numerals identify similar structural features or aspects of the subject disclosure. For purposes of explanation and illustration, and not limitation, a partial view of an exemplary embodiment of a rotary speed detector in accordance with the disclosure is shown in FIG. 1 and is designated generally by reference character 100. Other embodiments of rotary speed detectors and related methods in accordance with the disclosure, or aspects thereof, are provided in FIGS. 2-4, as will be described. The systems and methods described herein can be used in engine control systems for determining the speed of rotary components in aircraft gas turbine engines, though the present disclosure is not limited to engine control systems, gas turbine engines, or to aircraft in general.

With reference to FIG. 1, rotary speed detector 100 is shown. Rotary speed detector 100 is connected to a rotation sensor 10 that is configured and adapted to provide a signal including information relating to the rotational position of a shaft, e.g., shaft 2. Rotation sensor 10 includes a rotatable gear element 12 having one or more teeth 14, a coil 16, a pole piece 18, and a magnet 20. Gear element 12 is fixed relative to shaft 2 and rotates in concert with shaft 2. Coil 16 is fixed relative to gear element 12, is electromagnetically coupled to teeth 14, and is electrically connected to a sensor lead 102, which is electrically connected to rotary speed detector 100. Coil 16 is wrapped about a pole piece 18. Pole piece 18 is connected to a magnet 20 such successive passes of teeth 14 induce a voltage in coil 16 that oscillates according to the rotational speed R of shaft 2 about a rotation axis A. This causes coil 16 to apply an oscillating voltage to sensor lead 102.

Figure 2:
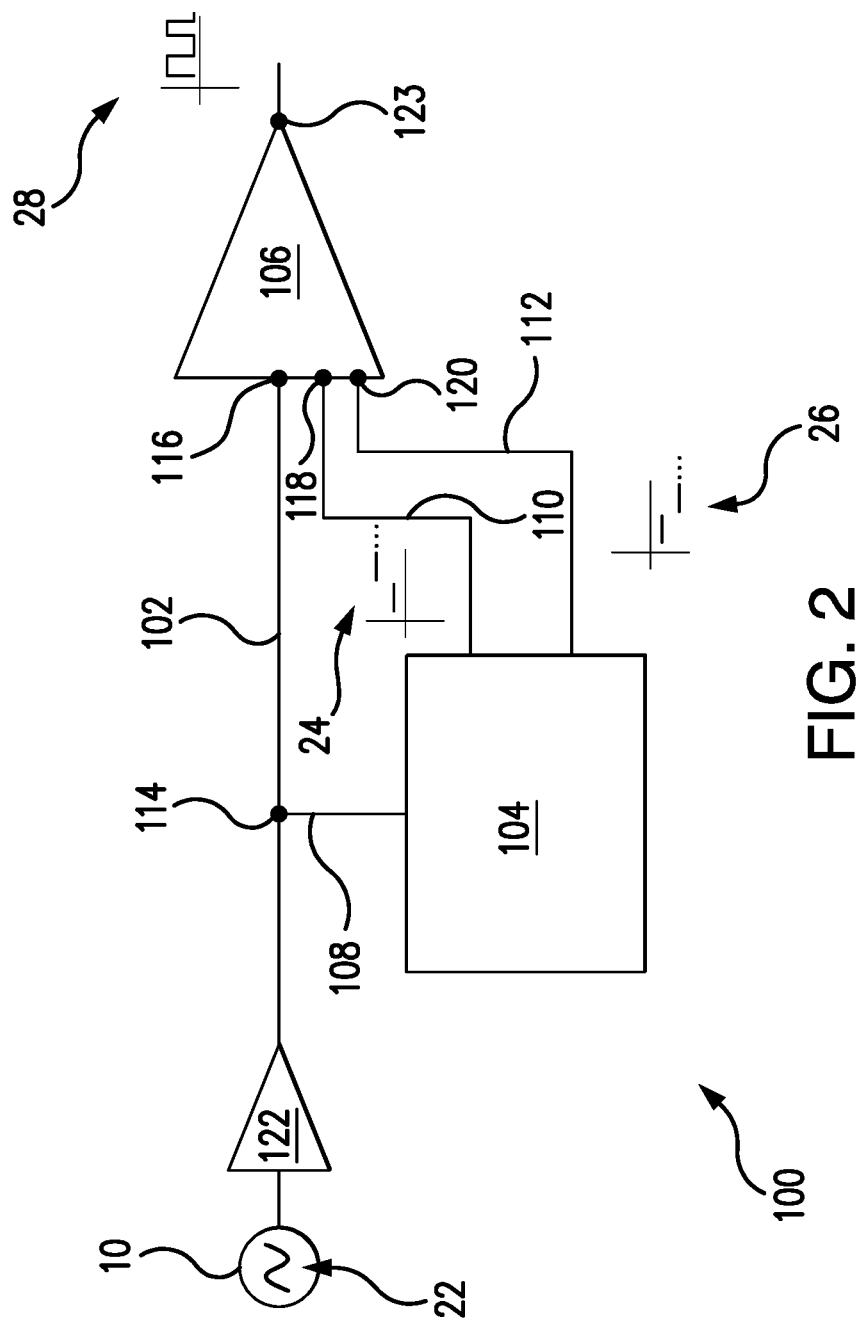
FIG. 2 is a schematic block diagram of the rotary speed detector of FIG. 1, showing the a limit set module providing upper and lower limit waveforms that vary in magnitude according to rotational speed of a rotating shaft.

With reference to FIG. 2, a block diagram of rotary speed detector 100 is shown. Rotary speed detector 100 includes a limit set module 104, a comparator module 106, a node lead 108, an upper limit lead 110, and a lower limit lead 112. Sensor lead 102 has a sensor lead node 114 that is connected in series between rotation sensor 10 and comparator module 106. Node lead 108 connects sensor lead node 114 with limit set module 104. Upper limit lead 110 and lower limit lead 112 each connect limit set module 104 with comparator module 106. A buffer 122 is connected in series with sensor lead node 114 between rotation sensor 10 and comparator module 106.

Comparator module 106 has a sensor input terminal 116, an upper limit input terminal 118, and a lower limit input terminal 120. Comparator module 106 also has an output terminal 123 that is configured an adapted to receive an output lead. Sensor lead 102 is connected to sensor input terminal 116 and applies thereto an oscillating voltage waveform 22 from rotation sensor 10. Upper limit lead 110 is connected to upper limit input terminal 118 and applies thereto an upper limit voltage waveform 24 generated by limit set module 104. Lower limit lead 112 is connected to lower limit input terminal 120 and applies thereto a lower limit waveform 26, also generated by limit set module 104.

Comparator module 106 is configured and adapted to apply a digital output voltage waveform 28 to output terminal 123. Digital output voltage waveform 28 is a binary waveform that toggles between a HIGH state and a LOW. In the illustrated exemplary embodiment digital output voltage waveform 28 toggles to a HIGH state when comparator module 106 detects that oscillating voltage waveform 22 crosses a predetermined level, e.g., zero voltage, with a positive slope, and toggles LOW when comparator module 106 detect that oscillating voltage waveform 22 crosses the predetermined level with a negative slope. The LOW state to HIGH states in a given time interval thereby correspond to passes of teeth 14 (shown in FIG. 1) by coil 16 (shown in FIG. 1), providing indication of rotational speed of shaft 2 (shown in FIG. 1).

Comparator module 106 is configured and adapted to generate digital output voltage waveform 28 from oscillating voltage waveform 22 using increasing hysteresis of oscillating voltage waveform 22. This generally entails comparing an input signal to a predetermined value that is adjusted according to the increasing amplitude of oscillating voltage waveform 22, which occurs as the rotational speed increases, to determine if the input signal is higher or lower than the predetermined value. The threshold level may be considered a dividing line whereby an input signal is considered either logic level HIGH if it is equal to or above the threshold level or logic level LOW otherwise. As will be appreciated by those of skill in the art in view of the present disclosure, oscillating waveforms such as oscillating voltage waveform 22 can include noise. Sources of such noise may include inaccuracies in gear tooth design or placement, electrical noise in the wiring harness or other structure connected to the sensor, and/or flux variation due to sensor vibration, shaft vibration, and/or vibration in other structure in proximity to the sensor. Such noise, or non-monotonic behavior, can cause additional toggle events between HIGH state and LOW states, which can cause errors in determination of the rotational speed of the shaft.

Comparator module 106 employs threshold adjustment to overcome the noise that can be present in oscillating voltage waveform 22. In this respect comparator module 106 receives from limit set module 104 an upper limit voltage waveform 24 at sensor input terminal 116 and a lower limit voltage waveform 26 at lower limit input terminal 120. These waveforms are adjusted according to the peak amplitude of oscillating voltage waveform 22 and or the root-mean-square (RMS) level present in the signal. In addition to the increased hysteresis necessary to detect rotational speed at high shaft speeds, this provides noise rejection at low rotational speeds. It can also provide noise rejection when the noise is close to the fundamental frequency of the sensor output that filtering is ineffective due to excessive attenuation of the underlying signal.

Figure 3:
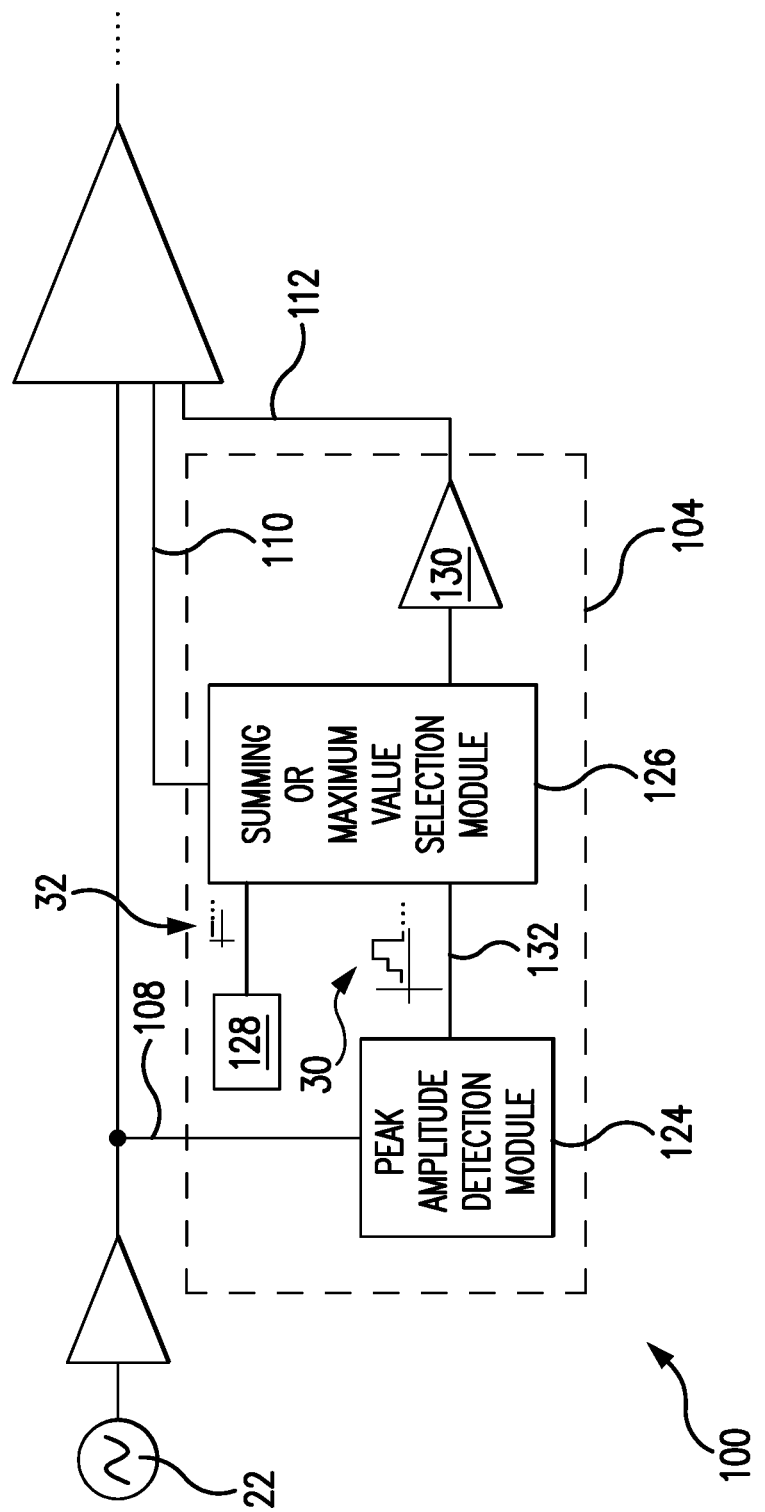
FIG. 3 is a schematic block diagram of the a rotary speed detector of FIG. 1, showing a limit set module having a peak amplitude detection module connected to a comparator module upper and lower limit leads.

With reference to FIG. 3, limit set module 104 is shown. Limit set module includes peak amplitude detection module 124, summing or maximum voltage selection module 126, a constant voltage source 128, and an inverting amplifier module 130. Peak amplitude detection module 124 is connected to sensor lead node 114 by node lead 108, and is configured to receive therethrough oscillating voltage waveform 22. Peak amplitude detection module 124 contains circuitry and/or software configured and adapted to determine the peak amplitude of the waveform dynamically, i.e. as the peak amplitude changes, and apply the peak as a peak voltage signal 30 to summing or maximum value selection module 126 through a peak amplitude lead 132.

Summing or maximum value selection module 126 is connected to peak amplitude detection module 124 through peak amplitude lead 132 and receives therethrough peak voltage signal 30. Summing or maximum value selection module 126 is also connected to constant voltage source 128 through a constant voltage source lead 134 and receives therethrough a constant voltage signal 32. Summing or maximum value selection module 126 has circuitry and/or software that is configured and adapted to compare peak voltage signal 30 to constant voltage signal 32, and based on the comparison (a) sum peak voltage signal 30 with constant voltage signal 32 when peak amplitude signal 32 is below a predetermined value, or (b) select peak voltage signal 30 when it is of a magnitude that is greater than the predetermined value.

Summing or maximum value selection module 126 thereafter applies the sum or selected voltage signal to upper limit lead 110, which provides sum or selected voltage signal directly to comparator module 106, and lower limit lead 112, which inverts the sum or selected voltage signal using inverting amplifier module 130 such that an inverse of the sum or selected voltage signal is provided to comparator module 106. As will be appreciated by those of skill in the art in view of the present disclosure, this provides automatic hysteresis control for both high rotational speed, where the upper and lower limits increase in magnitude according to increasing rotational speed, and low rotational speeds, wherein the upper and lower limits remain fixed below a certain rotational speed as reflected in the amplitude of oscillating voltage waveform 22 (shown in FIG. 2).

Figure 4:
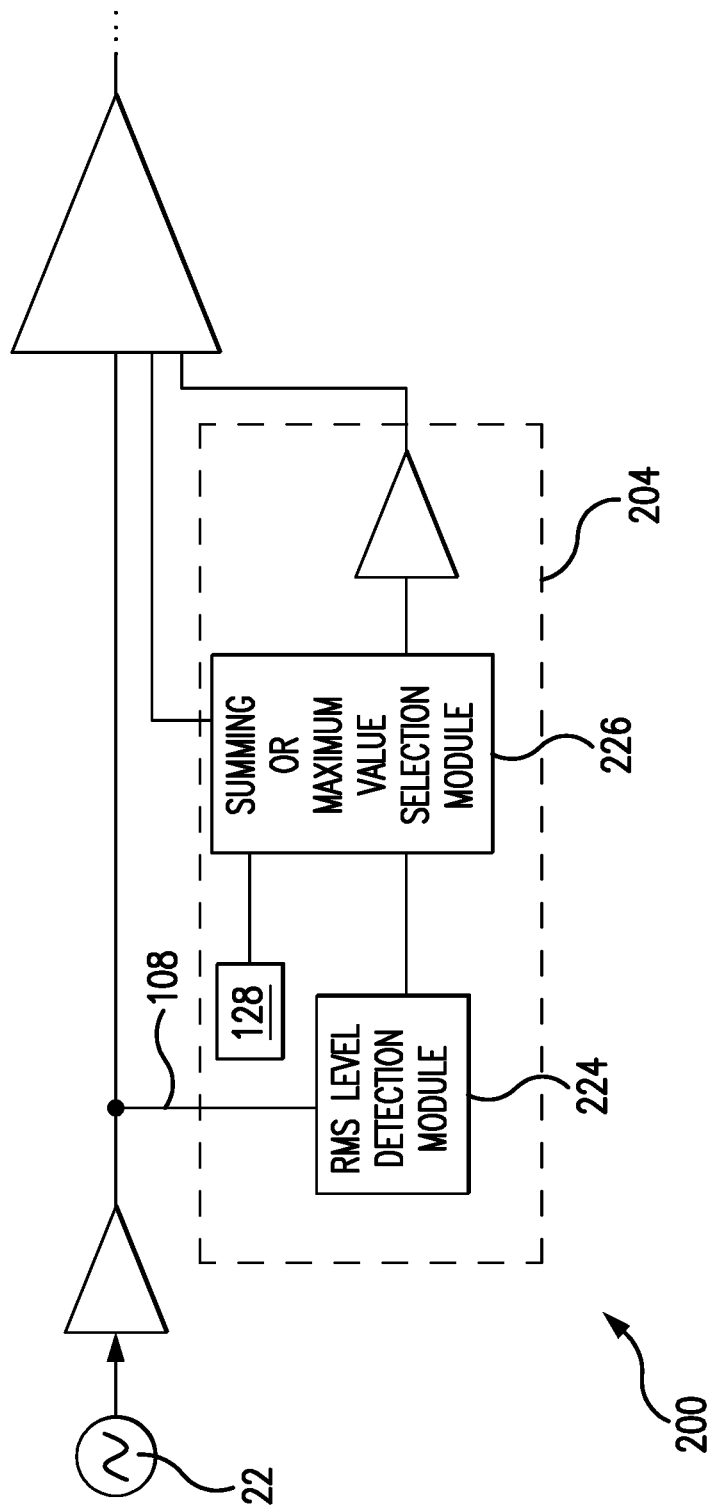
FIG. 4 is a schematic block diagram of another exemplary embodiment of a rotary speed detector of FIG. 1, showing a limit set module having a root-mean-square detection module connected to a comparator module upper and lower limit leads.

With reference to FIG. 4, a rotational speed detector 200 is shown. Rotational speed detector is similar to rotary speed detector 100 (shown in FIG. 3), and additionally includes a limit set module 204 with an RMS level detection module 224. RMS level detection module 224 is connected to node lead 108 and receives therethrough oscillating voltage waveform 22. RMS level detection module 224 has circuitry and/or software that is configured and adapted to determine the amount of RMS error in the oscillating voltage waveform 22. As will be appreciated by those of skill in the art, RMS error oscillating voltage waveform 22 increases as rotational speed of shaft 2 decreases, increasing the likelihood of pulse generation by comparator module 106.

Based on the determined RMS in oscillating voltage waveform 22, RMS level detection module 224 applies either the amplitude of oscillating voltage waveform 22 to summing or maximum value selection module 126 of a predetermined voltage that is below a voltage provided by constant voltage source 128. This cause the upper limit voltage waveform 24 provided to comparator module 106 and the lower limit voltage waveform 26 to be fixed when rotational speed of shaft 2 (shown in FIG. 1) drops below a rotational speed where hysteresis thresholding is effective. As will be appreciated, this rotational speed varies according the cause(s) of the noise in oscillating voltage waveform 22, such as vibration, electrical noise in the sensor harness, and/or noise frequency by way of non-limiting example.

A method of determining rotary speed of a rotatable component, e.g., shaft 2 (shown in FIG. 1), includes receiving an oscillating voltage (e.g., oscillating voltage waveform 22 shown in FIG. 2), indicative of rotational speed of the rotatable component. Amplitude of the oscillating voltage is determined using a limit set module, e.g., limit set module 104 (shown in FIG. 2). When amplitude of the oscillating voltage waveform is below a predetermined value a hysteresis level is set according to a fixed reference voltage, e.g., peak amplitude signal 32 (shown in FIG. 3). When amplitude of the oscillating voltage waveform is above the predetermined value, the hysteresis level varies according to the amplitude of the oscillating voltage, as shown with peak voltage signal 30 (shown in FIG. 4). The hysteresis level is applied with the oscillating voltage waveform as upper and lower limits to a comparator, e.g., comparator module 106, and rotational speed is determined by counting peaks in an output waveform, e.g., digital output waveform 28 (shown in FIG. 2) from the comparator over time.

It is contemplated that amplitude of the oscillating voltage waveform can be determined based on peak voltage of the oscillating voltage waveform, e.g., using peak amplitude detection module 124 (shown in FIG. 3). Amplitude of the oscillating voltage waveform can be determined based on RMS level of the oscillating voltage waveform, e.g., RMS level detection module 224 (shown in FIG. 4).

The methods and systems of the present disclosure, as described above and shown in the drawings, provide for rotary speed detectors with superior properties including rotational speed detection at low rotational speeds where the amplitude of the sensor output signal is low or noise present in the sensor output signal has a fundamental frequency that is close to the underlying positional signal. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotary speed detector, comprising:
 a comparator module;
 a sensor lead with a node connected to the comparator module;
 a limit set module connected to the sensor lead node;
 an upper limit lead connecting the limit set module to the comparator module;
 a lower limit lead connecting the limit set module to the comparator module,
 an inverting amplifier module connected in series between the summing or max value selection module and the lower limit lead;
 wherein the limit set module includes a root-mean-square (RMS) level detection module connected to the sensor lead node, and
 wherein the limit set module includes a summing or max value selection module connected in series between the RMS level detection module and the comparator module.

2. A rotary speed detector as recited in claim 1, wherein the summing or maximum value selection module is connected directly to the comparator module by the upper limit lead.

3. A rotary speed detector, comprising,
a comparator module;
a sensor lead with a node connected to the comparator module;
a limit set module connected to the sensor lead node;
an upper limit lead connecting the limit set module to the comparator module;
a lower limit lead connecting the limit set module to the comparator module;
a constant voltage source connected to the summing or maximum value selection module;
wherein the limit set module includes a root-mean-square (RMS) level detection module connected to the sensor lead node, and
wherein the limit set module includes a summing or max value selection module connected in series between the RMS level detection module and the comparator module.

4. A rotary speed detector as recited in claim 3, wherein the summing or maximum value selection module is connected directly to the comparator module by the upper limit lead.

* * * * *